Dec. 12, 1961  J. R. BOETTLER  3,013,107
CABLE CLAMP
Filed March 19, 1959

INVENTOR.
JACOB R. BOETTLER
BY
ATTORNEYS

United States Patent Office 3,013,107
Patented Dec. 12, 1961

3,013,107
CABLE CLAMP
Jacob R. Boettler, Chatham, N.J., assignor, by mesne assignments, to the United States of America as represented by the Secretary of the Navy
Filed Mar. 19, 1959, Ser. No. 800,607
4 Claims. (Cl. 174—89)

The present invention relates to clamps and has as one of its principal objects, the provision of an unusually strong clamping mechanism for attaching a length of armored cable to another component or object, such as a hydrophone or another cable length.

As indicated, one of the features of the present clamp is its unusual strength and, in a very general manner, this strength is achieved by separating the layers of armor which protects the conductors and by binding this layer independently of the remainder of the cable in a series of pressured clamping rings. The remaining portion of the cable (referred to as the cable core) is permitted to extend through the rings so that it can be electrically coupled in any desired manner internally of the particular component or object to be fed by the cable conductors.

Figure 1:
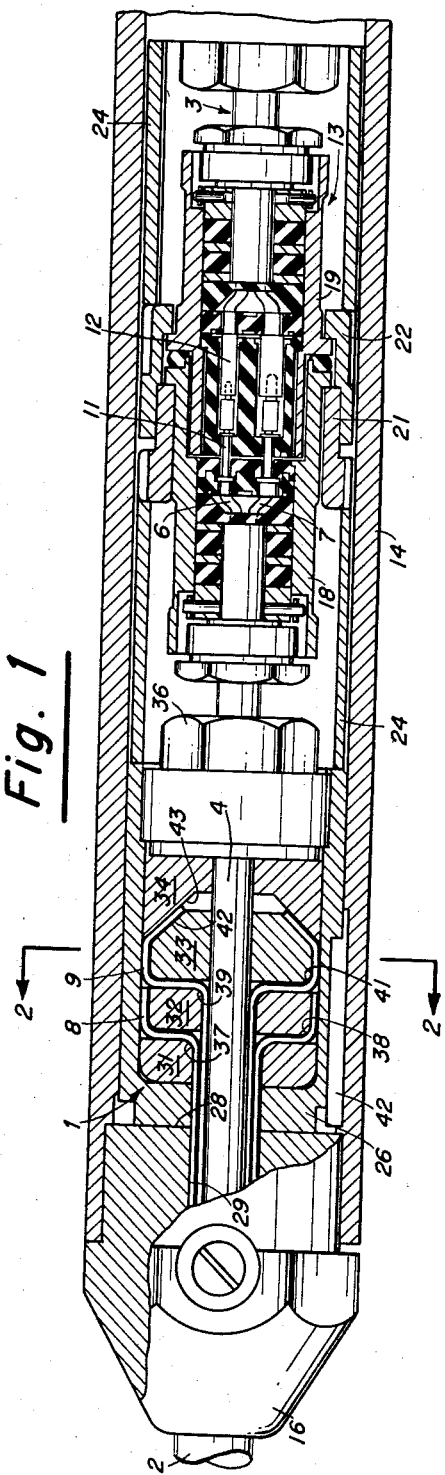
Figure 2:
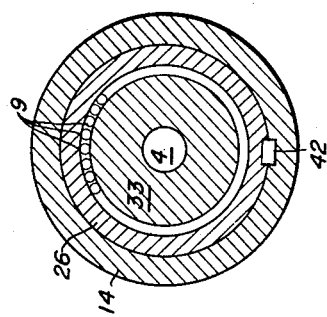

The invention is illustrated in the accompanying drawings of which FIG. 1 is a sectional view depicting one application of the invention in which the clamps are employed for binding together a pair of armored cable lengths and FIG. 2 a transverse section along line II—II of FIG. 1.

Referring to FIG. 1, identical clamping mechanisms 1 are used to bind together cable lengths 2 and 3 which, as may be noted, are of a conventional armored cable type having a central core 4 formed of conductors 6 and 7, and armor wire layers 8 and 9. Usually, the armor layers have a plural number of interwoven wires of opposite lay and, by way of example, such a layer may include forty-two interwoven wires.

It also is to be noted that cable cores 4 extend through the clamping mechanisms and are centrally coupled together by male and female connections 11 and 12 contained in a sealed casing 13. The casing, as well as the clamping mechanisms are mounted in an elongate sleeve 14 which has caps 16 threaded into its end portions.

However, the sleeve and caps are, for the most part, elements of an entire connector assembly in which the clamping mechanism of the present invention is an important component. This assembly, in turn, forms the subject matter of another co-pending application, Serial Number 800,608, filed March 19, 1959 and, in a general manner, it includes a pair of housings 18 and 19 disposed within the sleeve and adapted, upon rotation of specially-formed union rings 21 and 22 to telescopably unite to form a sealed casing. The uniting of the housings couples together the male and female connectors which electrically unite the cable lengths, and, of equal importance, produces a seal by exerting pressure upon an O-ring gasket disposed between the housings. Spacer rings 24 are used to hold the united connector pieces a fixed distance from the clamps and the entire assembly is bound together securely by the threaded engagement of caps 16.

The clamping mechanism of the present invention is formed of a cup-shaped body 26 having a rear wall 28 provided with a central opening 29 sized to closely receive the armored cables. The clamping force is provided by plural clamping rings 31, 32, 33 and 34, although it is obvious that, if there were only one armor layer, fewer rings would suffice. These rings, in turn, are pressured into clamping engagement by a nut 36 threaded into the cup-shaped body and bearing against innermost ring 34. In the illustrated embodiment, pressure also is applied by sleeve caps 16.

A further feature of the clamping mechanism is the manner in which the armored layers are bound by the rings and also the special formation of the clamping rings which permits this binding action. As to the binding action, it may be noted that, interiorally of clamp body 26, the wire layers are separated from cable core 4 and each layer is distributed radially-outwardly and then over one of the rings (FIG. 2). Thus, layer 8 is bent outwardly around inner ring 31, which preferably is formed with a rounded inner edge 37, and then over an outer ring 32 which has a rounded outer edge 38. In a similar manner, layer 9 is bent outwardly around a rounded edge 39 of ring 32 and then over another rounded edge 41 of a second outer ring 33. Consequently, the wires of each layer are provided with two right angle bends and, as also is to be noted, the wires of layer 9 have an additional 45 degree angle bend. This latter bend is permitted by forming ring 33 with its inner face 42 inclined at an angle of approximately 45 degrees. A third ring 34 has its outer face 43 recessed at a matching angle for the obvious purpose of mating with ring 33 and binding the end portion of the wires of layer 9.

The clamping rings should be specially sized to accommodate the wire bends. Thus, inner ring 31 diametrically conforms to the inner diameter of body portion 26 and it has a central bore about equal in diameter to that of the armored cable. Ring 32, however, has a lesser outer diameter than ring 31 to permit the wires of layer 8 to extend over it. Also, ring 32 has an inner diameter matched to the diameter of the single, remaining armor layer 9. Outer ring 33 conforms to ring 32 in outer diameter, but its central bore is sized to closely receive only cable core 4. Ring 34 has its central bore sized for core 4 and its outer diameter matching the inner diameter of clamp body 26.

An additional feature useful in many applications is the incorporation of a key 42 to retain any undesired rotational movement of clamp body 26. The keying effect may be provided by forming matching key-receiving grooves in cable body 26 and sleeve 14, respectively. When rotational members, such as caps 16 are used to exert pressure upon the clamping rings, the keying is a desirable adjunct.

Operationally, it already has been noted that the clamping pressure is achieved by applying wire-binding pressure to the clamping rings either by means of caps 16 or by the use of nut 36. The strength of the clamp readily can be visualized and, as will be appreciated, unusual tensile strength is provided by separating and distributing of the wires around and over a plural number of rings. It also will be apparent that the entire mechanism can be formed quite easily without the need for any special tools or equipment, such a feature being important because of the need for making corrections of this type on location.

The advantages of using the present clamping mechanism for attaching heavy objects such as a hydrophone stem from the strength of the attachment and, in this regard, it will be appreciated that strength may be a very vital consideration because of the weight of the object or because of the depths being worked.

Obviously many modifications and variations of the present invention are possible in the light of the above teachings. It is therefore to be understood that within the scope of the appended claims the invention may be practiced otherwise than as specifically described.

What is claimed is:

1. A clamp for securing an armored cable comprising a sleeve member, a counter-bored cylindrical body member having an open and a closed end, said body member being slidably fitted in said sleeve and provided at its closed end with an opening sized for closely receiving said cable, a cap threadably engaging an end portion of said sleeve and adapted to bear against said closed end of said body member, said cap being provided with an opening adapted to be aligned with said body member opening for receiving said cable, keying means for locking said body member against rotation relative to said sleeve, a plurality of armor-clamping rings slidably mounted in said body member counter-bore, and nut means threadably mounted in the open end of said body member for exerting armor-clamping pressure on said rings, said rings including an inner ring diametrically-dimensioned in substantial conformity with said body member closed end, a second outer ring of lesser internal and external diameter than said inner ring, whereby said armor can be passed internally through said inner ring and externally over said second ring and a third ring disposed between said outer ring and said nut means, said third ring having substantially the same external diameter as said inner ring for slidably fitting said body member counterbore.

2. The clamp of claim 1 wherein said outer ring has a bevelled outer face over which a portion of said armor can be extended, and said third ring has its inner face concavely formed for mating with said outer ring bevel for providing a secure clamping engagement of the armor portion extending over said bevelled face.

3. Apparatus for coupling together a pair of armored cables, said apparatus comprising a sleeve member, counter-bored cylindrical body members, each having an open end and a closed end and each being slidably fitted in each end of said sleeve member, each of said body members being provided at its closed end with an opening sized for closely receiving said cable, a cap threadably engaging each end portion of said sleeve and adapted to bear against the closed end of the body member disposed adjacent to it, keying means for locking each of said body members against rotation relative to said sleeve, a plurality of armor-clamping rings slidably mounted in each of said body member counter-bores, nut means threadably mounted in the open end of each of said body members for exerting armor-clamping pressure on said plurality of rings, and rigid spacer means disposed between and in contact with each of said body members for maintaining said members in a desired spaced relationship, said rings including an inner ring diametrically-dimensioned in substantial conformity with said body member closed end, a second outer ring of lesser internal and external diameter than said inner ring, whereby said armor can be passed internally through said inner ring and externally over said second ring, said outer ring having a bevelled outer face over which a portion of said armor can be extended, and a third ring having substantially the same external diameter as said inner ring for slidably fitting said body member counter-bore and further having its inner face concavely formed for mating with said outer ring bevel for providing a secure clamping engagement of the armor portion extending over said beveled face.

4. The apparatus of claim 3 wherein each of said nut means is provided with a central opening through which said cables can be passed.

References Cited in the file of this patent

UNITED STATES PATENTS

| | | |
|---|---|---|
| 779,469 | Dossert | Jan. 10, 1905 |
| 2,177,509 | Abbott | Oct. 24, 1939 |
| 2,804,601 | Harthman et al. | Aug. 27, 1957 |

FOREIGN PATENTS

| | | |
|---|---|---|
| 846,186 | France | May 27, 1939 |